United States Patent [19]
Hashimoto et al.

[11] Patent Number: 6,032,086
[45] Date of Patent: *Feb. 29, 2000

[54] CONTROL SYSTEM FOR INDUSTRIAL ROBOTS

[75] Inventors: Yoshiki Hashimoto, Hadano; Tatsuya Obi, Minamitsuru-gun, both of Japan

[73] Assignee: Fanuc Ltd., Minamitsuru-gun, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/530,334

[22] PCT Filed: Feb. 15, 1995

[86] PCT No.: PCT/JP95/00213

§ 371 Date: Oct. 4, 1995

§ 102(e) Date: Oct. 4, 1995

[87] PCT Pub. No.: WO95/24297

PCT Pub. Date: Sep. 14, 1995

[30] Foreign Application Priority Data

Mar. 8, 1994 [JP] Japan .................................. 6-036811

[51] Int. Cl.[7] ........................... G05B 15/00; G05B 19/00
[52] U.S. Cl. ............................ 700/245; 700/79; 700/95; 700/96; 395/200; 395/275; 395/901; 361/683; 361/686; 361/724; 312/223.6; 340/825.06
[58] Field of Search ................... 361/686, 415, 361/683, 724, 728–735, 807, 809; 340/825.06; 395/275, 325, 200, 901; 180/65.1; 312/223.1–223.6

[56] References Cited

U.S. PATENT DOCUMENTS

| | | | |
|---|---|---|---|
| 3,708,618 | 1/1973 | Hofmeister et al. | 361/686 |
| 3,925,710 | 12/1975 | Ebert | 361/686 X |
| 4,016,407 | 4/1977 | Mesecar et al. | 235/92 |
| 4,035,715 | 7/1977 | Wyman et al. | 323/4 |
| 4,379,335 | 4/1983 | Kirsch et al. | 364/192 X |
| 4,530,066 | 7/1985 | Ohwaki et al. | 364/708 |
| 4,578,764 | 3/1986 | Hutchins et al. | 364/131 X |
| 4,680,674 | 7/1987 | Moore | 361/686 |
| 4,790,762 | 12/1988 | Harms et al. | 439/59 |
| 4,901,202 | 2/1990 | Leschinger | 361/724 |
| 4,956,750 | 9/1990 | Maggelet | 361/415 |
| 4,965,880 | 10/1990 | Petitjean | 364/468 |
| 4,967,864 | 11/1990 | Boyer et al. | 180/65.1 |
| 5,138,701 | 8/1992 | Ohira et al. | 395/200 |
| 5,156,226 | 10/1992 | Boyer et al. | 180/65.1 |
| 5,274,781 | 12/1993 | Gibart | 395/325 |
| 5,416,908 | 5/1995 | DiCarlo et al. | 395/275 |
| 5,508,689 | 4/1996 | Rado et al. | 340/825.06 |
| 5,510,993 | 4/1996 | Williams et al. | 364/474.11 X |
| 5,541,810 | 7/1996 | Donhauser et al. | 361/686 |

FOREIGN PATENT DOCUMENTS

| | | |
|---|---|---|
| 61-205788 | 12/1986 | Japan . |
| 2 143 205 | 2/1985 | United Kingdom . |

OTHER PUBLICATIONS

David Bar–On, David Gershon Amons Israeli, and Gabi Zuniga. Track II: A Multiprocessor Robot Controller, COMPEURO '93 Computers in Design, Manufacturing and Production. IEEE Publications, 0–8186–4030–8/93, 1993.

Luca Ferrarini. Multi–Level and Modular Synthesis and Analysis of Logic Control Systems, Decision and Control, 1993 32nd Annual Conference. IEEE Publications, 0191–2216/93, 1993.

(List continued on next page.)

*Primary Examiner*—William Grant
*Assistant Examiner*—McDieunel Marc
*Attorney, Agent, or Firm*—Staas & Halsey LLP

[57] ABSTRACT

A control system which is arranged adjacent to a robot mechanical unit and on which maintenance work can be easily carried out. The control system includes a first unit and a second unit. The first unit includes relatively low-maintenance components and the second unit includes relatively high-maintenance components. Further, the first unit and the second unit are connected such that they can be mechanically and electrically separated from each other with ease, thereby making it possible to effect replacement unit by unit.

2 Claims, 4 Drawing Sheets

OTHER PUBLICATIONS

Francis Chen, Sangtao Ma, and C. S. Chen. An Innovative Architecture for Industrial Controller, Industry Applications Society, 1992 Annual Meeting. IEEE Publications, 0–7803–0634–1/92, 1992.

R. H. Weston, R. Harrison, A. H. Booth and P. R. Moore. A New Approach to Machine Control, Computer Aided Engineering Journal, Feb. 1989.

M. Buhler, L. Whitcomb, F. Levin, and D. E. Koditschek. A New Distributed Real–Time Controller for Robotics Applications, COMPCON Spring '89 IEEE Computer Society Int'l. Conference. IEEE Publications CH2686–4/89/0000/0063, 1989.

Microsoft Computer Dictionary, 2d Edition, pp. 259–260, 1994.

CONTROL SYSTEM FOR INDUSTRIAL ROBOTS

BACKGROUND OF THE INVENTION

1. Field of the Invention

This invention relates to a control system for industrial robots, and more particularly to a control system for industrial robots which is applied to a robot system which dispenses with a connecting cable for connecting the control system to a robot mechanical unit by arranging the control system adjacent to the robot mechanical unit, with enhanced maintainability.

2. Description of the Related Art

Conventionally, to control a robot mechanical unit by a robot control system, it is required to arrange the robot control system outside a range of operation of the robot mechanical unit, e.g. outside the safety fence, and establish a connection between the robot mechanical unit and the robot control system by a connecting cable for remote control of the former by the latter. Such an arrangement of the robot control system necessitates a space for installing the robot control system, and furthermore equipment for protection of the connecting cable.

So long as installation of an industrial robot within a limited space, such as a factory site, is concerned, it is gradually getting difficult to secure a space for installing a robot control system and provide equipment for protection of a connecting cable therefor. For this reason, the arrangement of a robot mechanical unit and a robot control system which dispenses with the connecting cable is contemplated. According to this arrangement, the control system is reduced in size and installed in a dead space, i.e., in a nonusable range of operation of the robot mechanical unit which is at a location adjacent to the robot mechanical unit.

Normally, the maintenance of the control system for industrial robots is carried out component by component. However, the arrangement of the control system installed adjacent to the robot mechanical unit necessitates reduction of the sizes of components of the control system and the size of a cabinet for receiving these components therein. Further, an operator need enter within the safety fence and work in such a narrow space, which makes it difficult to carry out maintenance of the control system component by component, and requires longer working time e.g. in replacement of a faulty component.

SUMMARY OF THE INVENTION

The present invention has been made in view of these circumstances, and the object thereof is to provide a control system for an industrial robot, which is capable of simplifying the maintenance work of the control system arranged adjacent to a robot mechanical unit to thereby reduce working time.

To attain the object, the present invention provides a control system for an industrial robot, which is constructed such that the control system is arranged adjacent to a robot mechanical unit, the control system comprising a first unit mainly containing components each having a low maintenance-demanding property, and a second unit connected to the first unit in a manner mechanically and electrically separable therefrom and mainly containing components each having a high maintenance-demanding property.

According to the means described above, the components contained in the first unit suffer from a fault with very little frequency and hence require almost no maintenance, while the components contained in the second unit are components in which most faults occur in a concentrated manner. When a fault occurs in the control system, maintenance is not carried out component by component, but the second unit is removed from the first unit for replacement, thereby permitting maintenance to be carried out unit by unit. This simplifies the maintenance work very much, and shortens working time required in maintenance.

DETAILED DESCRIPTION OF THE PREFERRED EMBODIMENTS

The invention will now be described in detail with reference to the drawings showing an embodiment thereof.

Figure 1:
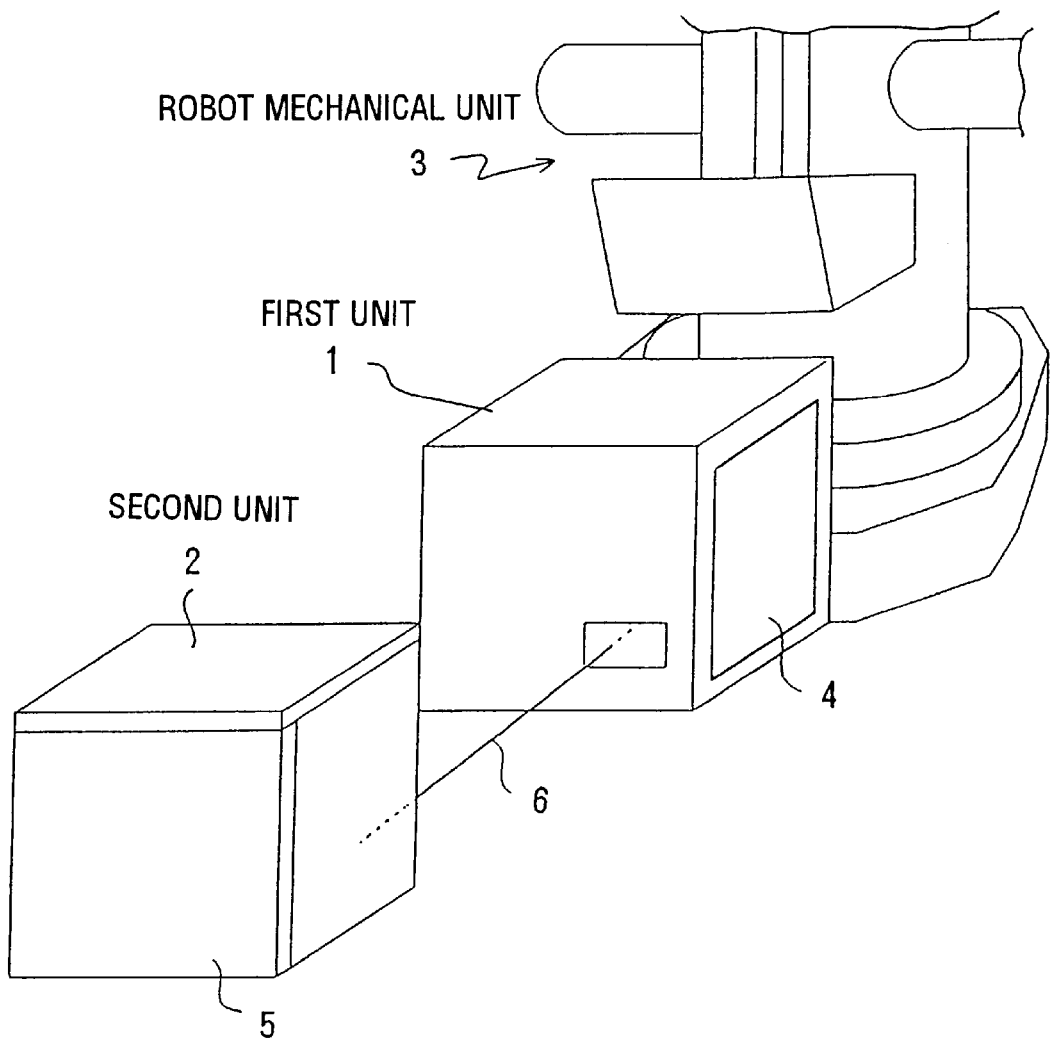
FIG. 1 is a diagram showing the arrangement of a control system for an industrial robot, according to an embodiment of the invention.

FIG. 1 shows the arrangement of a control system for an industrial robot, according to the embodiment of the invention. As shown in FIG. 1, the control system is constituted by the separate units of a first unit 1 and a second unit 2. These first and second units 1, 2 are installed in a space adjacent to a robot mechanical unit 3 at a location outside the range of operation of the robot mechanical unit 3, usually in a dead space located immediately behind the robot mechanical unit 3.

The first unit 1 contains components which are low in a maintenance-demanding property and heavy in weight, such as a transformer, and a breaker, and is arranged on the side of the robot mechanical unit 3. A cabinet of the first unit 1 is fixed to a base plate of the robot mechanical unit 3 e.g. by screws. Further, the cabinet has a side plate 4 fixed to a side face thereof e.g. by screws. The side plate 4 is removed to uncover an opening via which the components received in the cabinet are easily accessible. On the other hand, the second unit 2 contains components which are high in a maintenance-demanding property, such as printed circuit boards and servoamplifiers, and is arranged on the side of the first unit 1 opposite to the robot mechanical unit 3 for replacing components easily. It is possible to gain access to the components contained in the second unit 2 by removing a front panel 5 provided on a front face of the second unit 2.

A connecting cable 6 is provided between the first unit 1 and the second unit 2 for electrical connections between components of the first unit 1 and components of the second unit 2. It goes without saying that the first unit 1 and the robot mechanical unit 3 are electrically connected to each other, by cables, not shown, i.e. the first unit 1 is electrically connected to servomotors for driving the shafts of arms and hands of the robot mechanical unit 3, pulse coders for detecting operating positions of the arms and hands, etc.

The first unit 1 and the second unit 2 are further provided with a mechanism for physical connection between them. That is, the first unit 1 and the second unit 2 are normally used in a connected state, and for this purpose, their cabinets are provided with equipment constituted by parts separable from each other, such as snap fasteners, which easily establishes connection and cancellation of connection, whereby the units 1 and 2 are mechanically connected to each other. When maintenance is carried out e.g. upon occurrence of a fault, the connection by the equipment is canceled, thereby permitting the second unit 2 to be separated from the first unit 1 with ease. This makes it possible to replace unit by unit.

Figure 2:
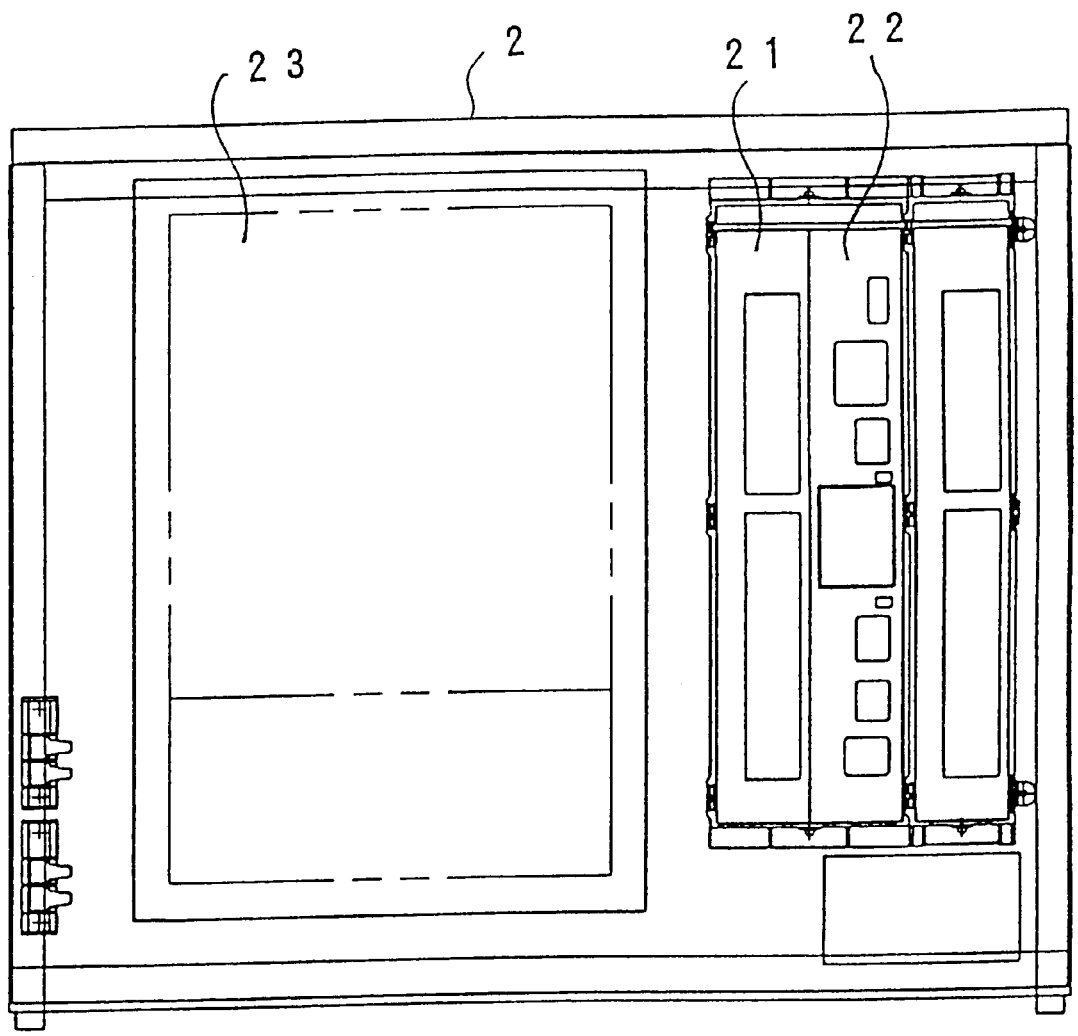
FIG. 2 is a diagram showing an example of internal construction of a second unit.

FIG. 2 is a diagram showing an example of an internal construction of the second unit. FIG. 2 shows the second unit 2 in a state in which the front panel 5 is removed therefrom. In the second unit 2, there is mainly contained a control block comprised of a control circuit board 21 including a processor, a power board 22, and a servoamplifier 23. FIG. 2 also shows a first step for removing the second unit 2 from the first unit 1 for replacement of the second unit 2. That is, to remove the second unit 2 from the first unit 1, it is necessary to remove connectors and terminals of the connecting cable connected to components within the first unit 1. To this end, after the front panel 5 (FIG. 1) is removed from the second unit 2, the connectors and terminals are removed as required. For example, removed are a power input terminal and a power output terminal for a magnetic contactor which are provided on the power board 22, an input terminal of an overheat sensor provided on the servoamplifier 23 for the transformer, connectors connected e.g. to an output terminal block for a regenerative discharge resistance, and so forth.

Figure 3:
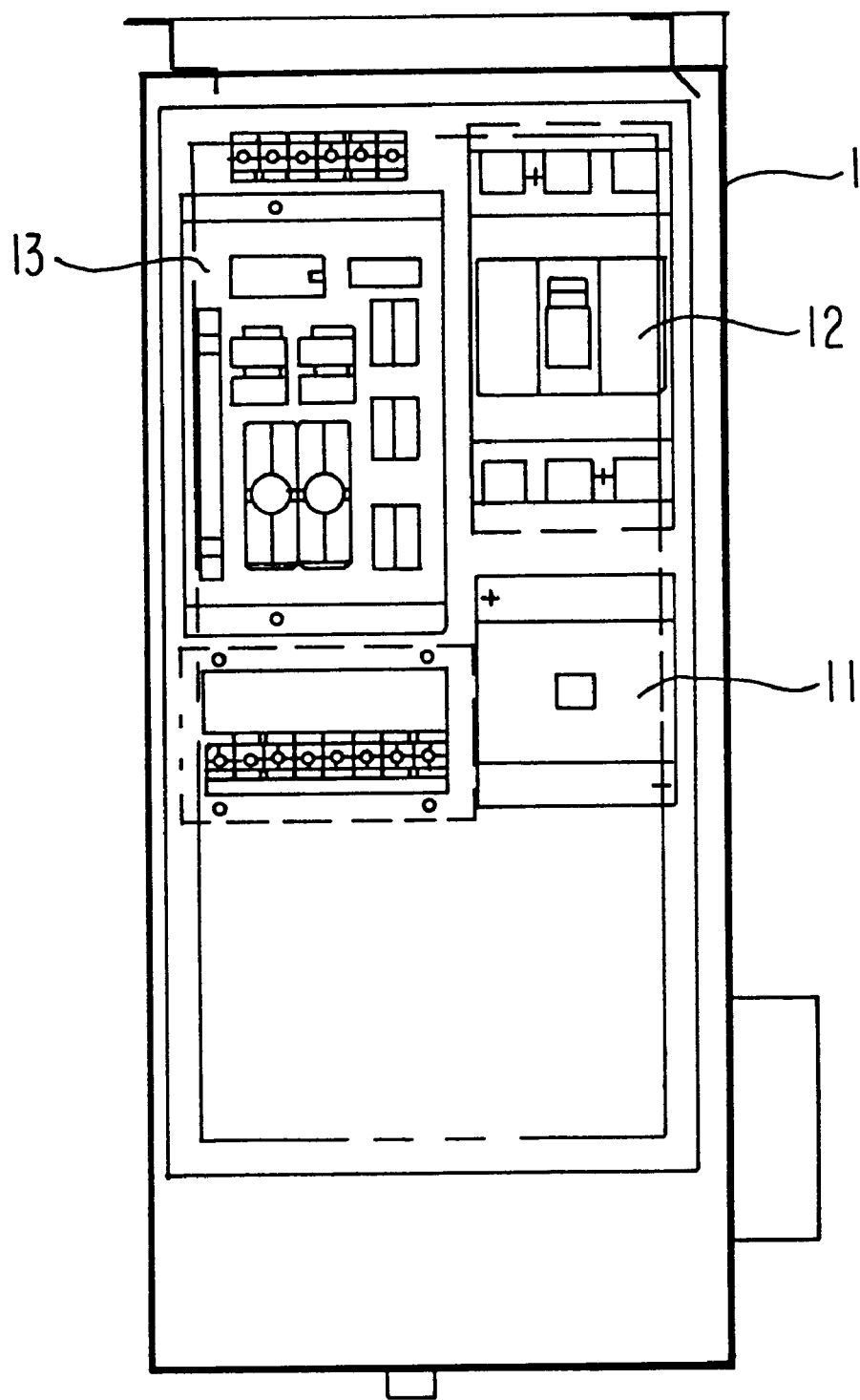
FIG. 3 is a diagram showing an example of internal construction of a first unit.

FIG. 3 is a diagram showing an example of internal construction of the first unit. FIG. 3 is a side elevation of the first unit 1 in a state in which the side plate 4 (FIG. 1) is removed therefrom. As shown in FIG. 3, on the side of the side plate 4, concentratedly arranged are various components except for the transformer, as well as connectors, terminals, terminal blocks and so forth which are required to be disconnected for disconnecting the end of the connecting cable 6 (FIG. 1) from the first unit 1. The first unit 1 contains components which hardly require maintenance, such as the transformer (not shown) received in a space located at the back of FIG. 3, a magnetic contactor 11, a breaker 12, and an emergency stop unit 13.

In removing the second unit 2 (FIG. 2) from the first unit 1, after removing the connectors and the like within the first unit 1, connecting portions necessitated within the second unit 2, e.g. terminals on the secondary side of the magnetic contactor 11 connected to the servoamplifier 23 (FIG. 2), are removed.

Figure 4:
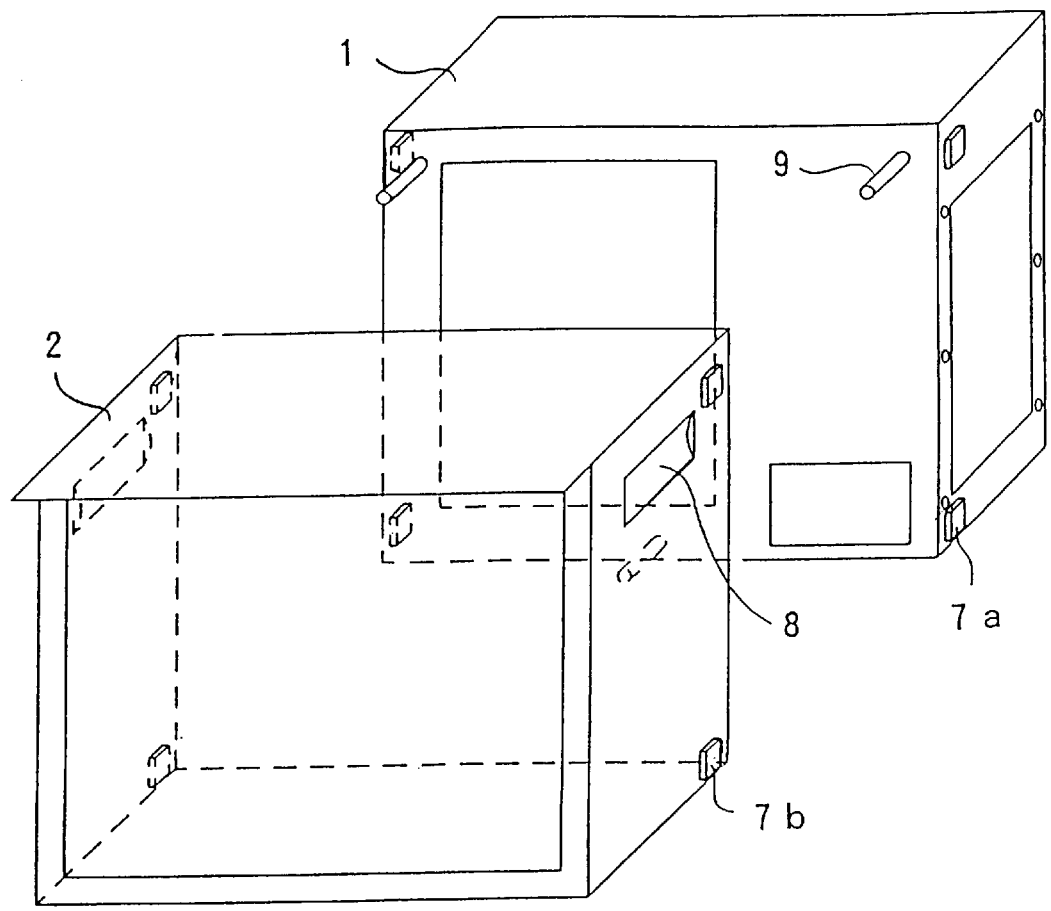
FIG. 4 is a diagram showing the control system in a state in which the second unit is removed from the first unit.

FIG. 4 shows the second unit in a state removed from the first unit. To remove the second unit 2 from the first unit 1, connection established by a pair of portions 7a, 7b of four snap fasteners respectively provided on the first and second units at top and bottom locations of their side faces, is canceled, and the second unit 2 is pulled forward. The second unit 2 is provided with handling depressions 8 on opposite side faces thereof, and the second unit 2 can be pulled off by the use of the handling depressions 8.

In replacing the second unit 2, a new second unit 2 is installed in the reverse of the removing procedure described above. That is, after both ends of the connecting cable 6 (FIG. 1) are passed through a cable duct into the first unit 1 and the second unit 2, guide pins 9 provided e.g. in the number of 3 on the front face of the first unit 1 are made in alignment with fitting portions formed in the second unit 2, and then the second unit 2 is pushed toward the first unit 1. The first unit 1 and the second unit 2 are mechanically connected to each other by the use of the portions 7a, 7b of the snap fasteners provided for joint at four points, in a position where the cabinet of the second unit 2 is brought into contact with the cabinet of the first unit 1. Then, the connecting cable 6 is connected to portions within the first unit 1 to which it is to be connected, and similarly, the connecting cable 6 is connected to portions within the second unit 2 to which it is to be connected. Finally, the side plate 4 and the front panel 5 are restored to their former conditions, thereby terminating the maintenance work.

As described heretofore, according to the present invention, the control system is divided into the first unit, which hardly requires maintenance of components therein, and the second unit, which requires maintenance of components therein, and further, these units are constructed such that they can be easily removed, thereby permitting replacement to be carried out unit by unit. As a result, maintenance work is simplified, and hence the number of steps of maintenance work can be reduced.

We claim:

1. A control system for an industrial robot, which is constucted such that said control system is arranged adjacent to a robot mechanical unit, comprising:

a first cabinet of a first robot control unit including components each requiring a relatively low frequency maintenance, wherein said first cabinet is arranged on a side of said robot mechanical unit; and a second cabinet of a second robot control unit connected to said first cabinet in a manner mechanically and electrically separable therefrom, and including components each requiring a relatively high frequency in maintenance, wherein said first cabinet and said second cabinet are equipped with a mechanism having portions that can be separated from each other and connected to each other.

2. A control system for an industrial robot, which is constructed such that said control system is arranged adjacent to a robot mechanical unit, comprising:

a first cabinet of a first robot control unit comprising transformer components, wherein, said first cabinet is arranged on a side of said robot mechanical unit; and a second cabinet of a second robot control unit connected to said first cabinet in a manner mechanically and electrically separable therefrom, and including a control circuit board including a processor, a power board and servo amplifier, wherein said first cabinet and said second cabinet are equipped with a mechanism having portions that can be separated from each other and connected to each other.

* * * * *